US007697004B2

(12) United States Patent
Regelous

(10) Patent No.: US 7,697,004 B2
(45) Date of Patent: Apr. 13, 2010

(54) METHOD OF ANIMATING A GRAPHICS CHARACTER USING FUZZY PROCESSING LAYERS

(75) Inventor: Stephen John Regelous, 14/26 Marion Street, Te Aro, Wellington (NZ)

(73) Assignees: Stephen John Regelous, Wellington (NZ); Stephen Noel Regelous, Albany (NZ)

(*) Notice: Subject to any disclaimer, the term of this patent is extended or adjusted under 35 U.S.C. 154(b) by 0 days.

(21) Appl. No.: 12/453,674

(22) Filed: May 18, 2009

(65) Prior Publication Data
US 2009/0284533 A1 Nov. 19, 2009

Related U.S. Application Data

(63) Continuation of application No. 10/486,348, filed as application No. PCT/NZ02/00151 on Aug. 7, 2002, now abandoned.

(30) Foreign Application Priority Data
Aug. 10, 2001 (NZ) ...................................... 513504

(51) Int. Cl.
G06T 13/00 (2006.01)
G06N 7/02 (2006.01)
(52) U.S. Cl. ........................................ 345/474; 706/900
(58) Field of Classification Search ................. 345/957, 345/958; 706/920
See application file for complete search history.

(56) References Cited

U.S. PATENT DOCUMENTS

| 5,268,998 A | 12/1993 | Simpson |
| 5,345,541 A | 9/1994 | Kelley et al. |
| 5,436,839 A | 7/1995 | Dausch et al. |
| 5,561,756 A | 10/1996 | Miller et al. |
| 5,864,342 A | 1/1999 | Kajiya et al. |
| 5,923,337 A | 7/1999 | Yamamoto |
| 6,061,672 A * | 5/2000 | Caponetto et al. ............... 706/2 |
| 6,064,388 A | 5/2000 | Reyzin |
| 6,139,434 A | 10/2000 | Miyamoto et al. |
| 6,282,526 B1 | 8/2001 | Ganesh |
| 6,446,056 B1 | 9/2002 | Sadakuni |
| 6,614,917 B1 * | 9/2003 | Phillips ....................... 382/103 |

(Continued)

FOREIGN PATENT DOCUMENTS

GB  2 346 526  7/1998

OTHER PUBLICATIONS

Andrea Bonarini, Filippo Basso, "Learning to compose fuzzy behaviors for autonomous agents," Nov. 1997, International Journal of Approximate Reasoning, vol. 17, Issue 4, Genetic Fuzzy Systems for Control and Robotics, pp. 409-432.*

(Continued)

Primary Examiner—Jason M Repko
(74) Attorney, Agent, or Firm—Nixon & Vanderhye P.C.

(57) ABSTRACT

A computer implemented method of generating behavior of a graphics character within an environment including a selected graphics character and one or more graphics elements, the method comprising: generating an image of the environment from a perspective of the selected graphics character; processing the image using an artificial intelligence engine with one or more layers to determine an activation value for the graphics character wherein at least one of the layers is a fuzzy processing layer, and generating the behavior of the graphics character based on the activation value.

14 Claims, 6 Drawing Sheets

U.S. PATENT DOCUMENTS 6,819,780 B2 * 11/2004 Benson et al. .............. 382/104

OTHER PUBLICATIONS

Daniel Thalmann, "Virtual sensors: A key tool for the artificial life of virtual actors", 1995, In Proc. Pacific Graphics '95.*

Alfredo Pina, Eva Cerezo, Francisco J. Seron, "Computer animation: from avatars to unrestricted autonomous actors (A survey on replication and modelling mechanisms)," Apr. 2000, Computers & Graphics, vol. 24, Issue 2, pp. 297-311.*

Olivier Renault, Nadia Magnenat-Thalmann, and Daniel Thalmann, "A Vision-Based Approach to Behavioral Animation," Aug. 1990, Visualization and Computer Animation, vol. 1, No. 1, p. 18-21.*

Olivier Renault et al., "A Vision-Based Approach to Behavioral Animation," Visualization and Computer Animation, Aug. 1990, vol. 1, No. 1, pp. 18-21.

Reynolds, "Flocks, Herds, and Schools: A Distributed Behavioral Model," Symbolic Graphics Division, ©1987, ACM-0-89791-227-6/87/007/0025, 13 pages.

* cited by examiner

METHOD OF ANIMATING A GRAPHICS CHARACTER USING FUZZY PROCESSING LAYERS

CROSS-REFERENCES TO RELATED APPLICATIONS

This application is a continuation of U.S. application Ser. No. 10/486,348, filed Feb. 10, 2004, which is the U.S. national phase of international application PCT/NZ02/00151 filed in English on 7 Aug. 2002, which designated the US. PCT/NZ02/00151 claims priority to NZ Application No. 513504 filed 10 Aug. 2001. The entire contents of these applications are incorporated herein by reference.

FIELD OF THE INVENTION

The present invention relates to a method of rendering an image and a method of animating a graphics character in response to rendered image information. More particularly, but not exclusively, the present invention relates to a method of rendering an image viewed by an autonomous computer generated character and a method for controlling behaviour of the character based upon the rendered image. The present invention may find particular application in autonomous computer generated character animation for video games and to produce visual effects for film or video. The invention may also find application in simulation and robot navigation applications.

BACKGROUND OF THE INVENTION

Most approaches to animation of autonomous computer generated characters do not utilise a character's view of its environment. Input for a character's artificial intelligence is typically obtained by searching a scene description database for input data and performing involved calculations to obtain required input data. This data is supplied to the character's artificial intelligence engine which outputs character behaviour information.

This approach has a number of disadvantages as follows:
1. occlusion must be ignored or else computed at a high computational cost.
2. resolution of input data is not proportional to distance unless this feature is explicitly computed.
3. visibility due to field of view has to be explicitly computed.
4. topological features such as holes, concavities and profile are difficult and inefficient to represent in a non vision based system.
5. Spatial subdivision optimisation must be used to avoid n squared performance scalability.
6. To provide accurate input information is computationally expensive and limits the number of autonomous computer generated characters that can be simultaneously controlled.

Reynolds, "Flocks, Herds, and Schools: A Distributed Behavioral Model" Computer Graphics, 21(4), July 1987, pp. 25-34, teaches automated behaviour of characters in a 3-D environment where the characters have limited knowledge of their environment.

Systems whereby the limited knowledge available to the character is derived from an image from the perspective of the character are also known.

However, such known systems do not compute distortion free images for wide angles of view.

A disadvantage of such known systems is characters are unable to be realistically responsive to their entire environment represented as a spherical view from the character's position.

Furthermore, the known systems process the image analytically to identify characteristics about objects within the field of view.

A disadvantage of such systems is that this processing costs computation time.

Another disadvantage of such systems is that the data loses generality and thereby limits the flexibility of the use of the data by the engine which determines behaviour of the character.

Another disadvantage is that analytical solutions are often susceptible to unpredictable or unstable behaviour when the input data is not as expected.

SUMMARY OF THE INVENTION

It is an object of the invention to provide a method of rendering an image to control the behaviour of an autonomous computer generated character which captures the necessary environmental information without imposing unduly complex computation.

It is a further object of the invention to provide a method of animating a graphics character that produces realistic behaviour without requiring unduly complex computation.

The above objects are both to be read disjunctively with the object of at least providing the public with a useful choice.

According to a first aspect to the invention there is provided a method of generating behaviour of a graphics character within an environment including a graphics character and one or more graphics element, the method including the steps of:
generating an image of the environment from the perspective of the selected graphics character; and
processing the image using an artificial intelligence engine with one or more layers to determine an activation value for the graphics character wherein at least one of the layers is a fuzzy processing layer.

Image data is preferably obtained by one of the rendering methods described below. Image data for the view generated is preferably processed within the first layer of an artificial intelligence engine to obtain fuzzy logic values. A second layer of the artificial intelligence engine may apply fuzzy rules to the fuzzy logic values to obtain input values for a middle layer of the artificial intelligence engine. Alternatively the second layer of the artificial intelligence engine may be a neural network. These values may be processed by the middle layer of the artificial intelligence engine to obtain activation values to control character behaviour. The middle layer of the artificial intelligence engine may be a fuzzy logic network, a neural network or a binary logic network. Where the middle layer is a fuzzy logic network a defuzzifying output layer may be employed.

Sound registers may also be associated with the character. Behaviour of the character may be based upon image and/or sound information.

There is further provided a first method of rendering an image from three dimensional graphical information comprising:
rendering images for a plurality of adjacent image subspace regions, wherein the images are rendered as viewed from a common view point and different viewing orientations.

The images rendered are preferably derived from a plurality of adjacent image subspace sectors and combined to form a single image. A scanline rendering technique is preferably employed. Image subspace areas may be vertically and/or horizontally subdivided.

There is further provided a second method of rendering an image from graphical information comprising:

performing a polar transformation to determine the position(s) of one or more vertices of a graphics primitive;

projecting the graphics primitive into sub images;

clipping the graphics primitive against the sub image to form clipped primitives;

performing polar transformations of the vertices of the clipped images;

interpolating across the surface of the clipped primitive vertices to form pseudo polar sub images; and combining the pseudo polar sub images to form an image.

The sub images are preferably in the form of a rectangular grid. The image formed is preferably rendered in Cartesian space utilising the two polar axes.

BRIEF DESCRIPTION OF THE DRAWINGS

The invention will now be described by way of example with reference to the accompanying drawings in which.

DETAILED DESCRIPTION OF THE INVENTION

The present invention discloses a method of determining the behaviour of an autonomous computer generated character based upon a generated image of the graphical environment around the character rendered from the viewing perspective of the character. This approach simplifies computation and enables realistic character behaviour to be achieved relatively easily.

In this specification the word "image" refers to an array of pixels in which each pixel includes at least one data bit. Typically an image includes multiple planes of pixel data (i.e. each pixel includes multiple attributes such as luminance, colour, distance from point of view, relative velocity etc.).

The first step is to render an image of the environment as viewed from the perspective of the character for which behaviour is being generated. Where a relatively narrow range of view (e.g. 90°) is utilised to determine character behaviour, standard scanline rendering approaches may be employed. Ray tracing methods could be employed, although they would suffer from a much higher computational overhead.

As the field of view of the character widens, distortions of the image rendered, especially towards the edges, start to be significant in their effect upon character behaviour. Two methods are described below which may be utilised to generate an image as viewed by the character suitable for providing input to an artificial intelligence engine for determining character behaviour.

Figure 1:
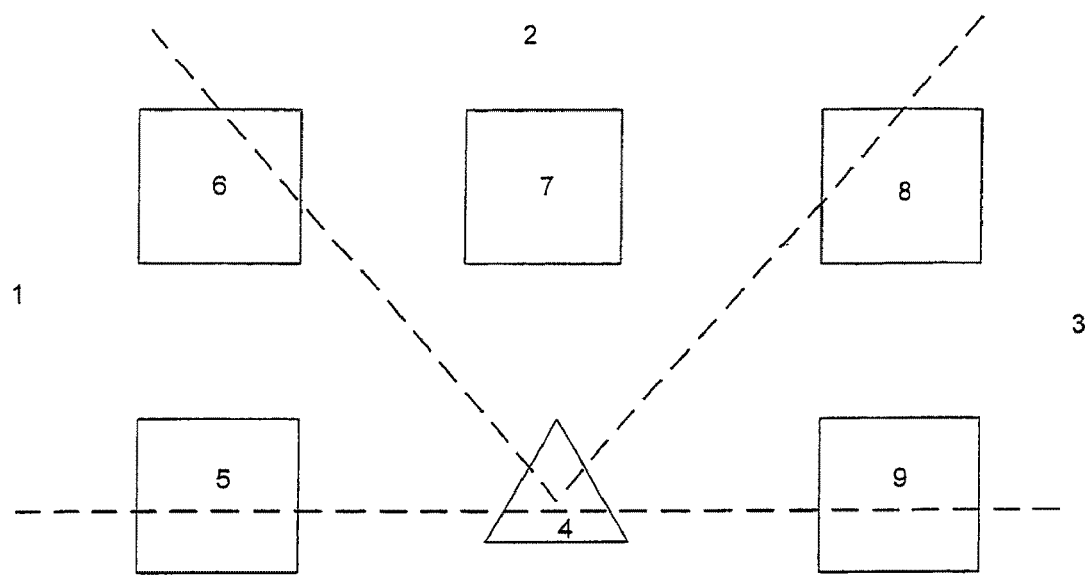
FIGS. 1 and 2 illustrate a first rendering method.

According to a first method illustrated in FIG. 1 a 180° viewing area is divided into three sectors 1, 2 and 3. It will be appreciated that any desired viewing range up to 360° may be selected. The sectors define fields of view (in this case 60° segments) from the perspective of an autonomous computer generated character 4. In this case the environment consists of blocks 5 to 9.

Figure 2:
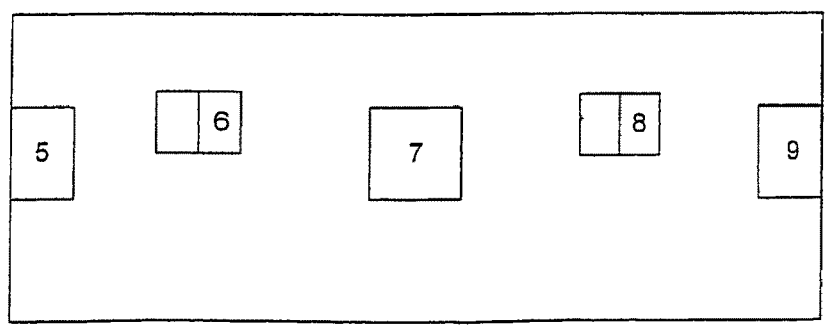

According to this first method an image is generated utilising a conventional scanline rendering process for each section 1, 2 and 3. The three images rendered are merged together to produce a single image as shown in FIG. 2. The resulting bit mapped image shown in FIG. 2 is a simulated scene of the environment as viewed from the character's point of view and may be utilised as the input to an artificial intelligence engine. Each pixel may have a number of attributes.

Referring now to FIGS. 3 to 7 a second rendering method utilising a polar viewing transform will be described.

Wide angles of view are often used. The orthodox perspective transform of the scanline rendering process results in distortion for wide angles of view. The polar viewing transform of the second rendering method can help minimise distortion resulting from wide angles of view.

Figure 3:
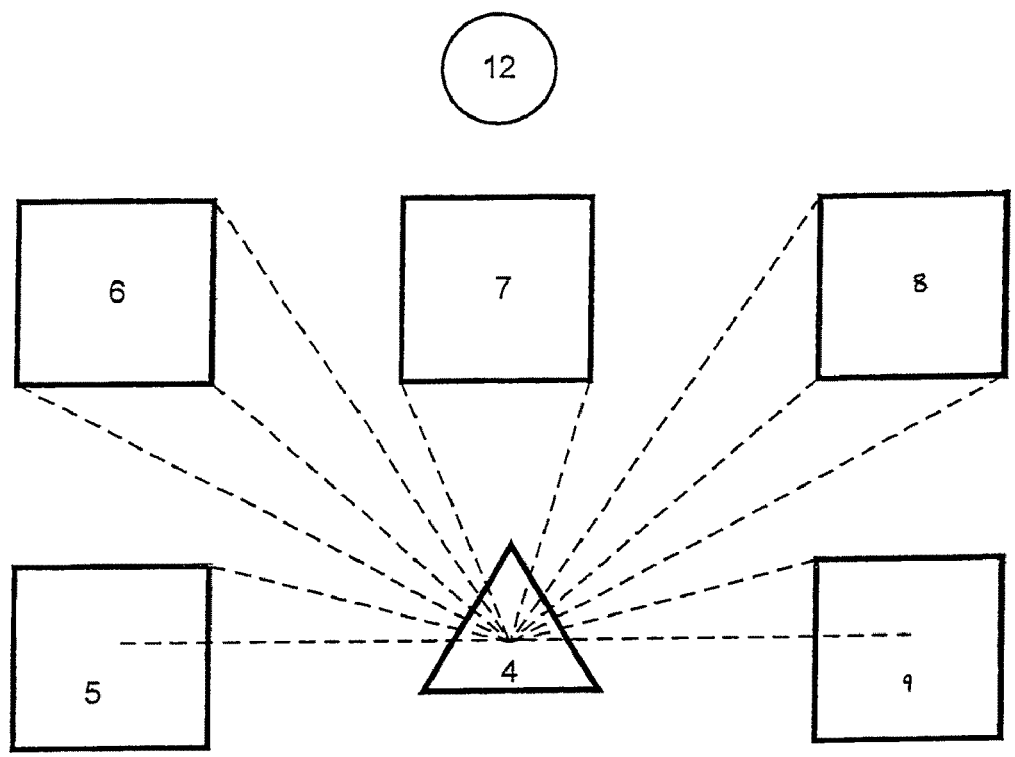
FIGS. 3 and 4 illustrate a second rendering method.

FIG. 3 shows a plan view of an environment consisting of blocks 5 to 9 surrounding an autonomous computer generated character 4. Dashed lines are shown extending from the point of view of character 4 to the vertices of environmental objects 5 to 9.

Figure 5:
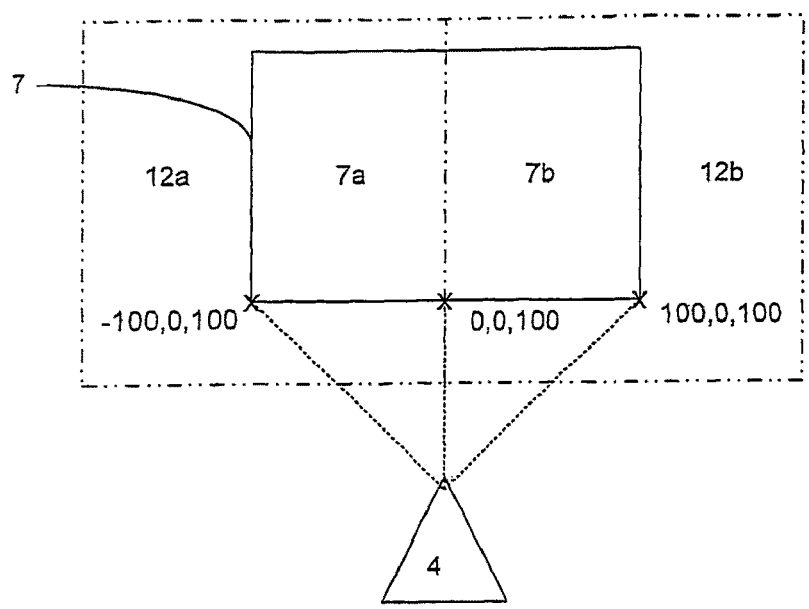
FIGS. 5 to 7 illustrate the rendering of a sub image component.
Figure 6:
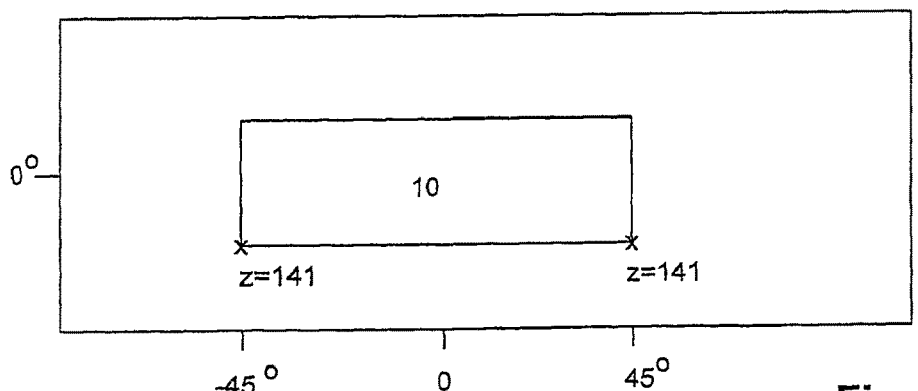

According to this method polar transformations of the vertices of primitives are calculated to determine their location in image space. FIG. 5 shows the Cartesian co-ordinates of the vertices of block 7 as −100, 0, 100 and 100, 0, 100. Following a polar transformation as shown in FIG. 6 the vertices are shown at −45° and +45° (with z values of 141). A polar space interpolation has been effected in FIG. 6 between the vertices resulting in a square primitive 10. In this figure the x and y axes are polar angles and the z value is an attribute of each pixel.

Figure 7:
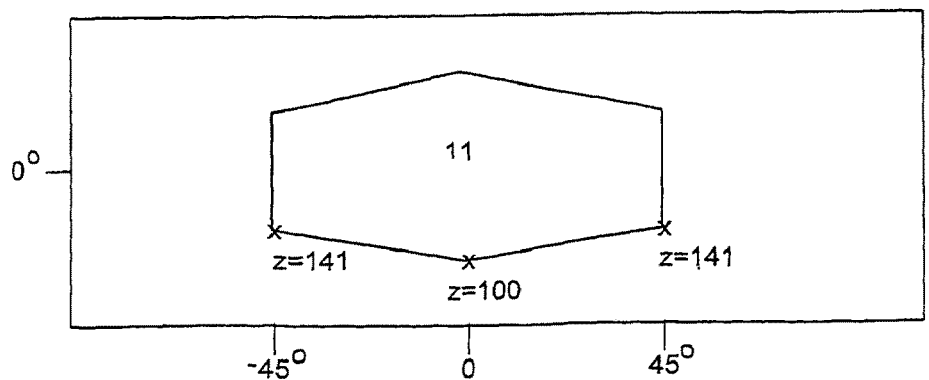

To reduce wide angle distortion, graphics primitive 7 may be projected into sub images 12a and 12b. The number of sub images employed will depend upon the resolution required. Graphics primitive 7 is clipped against sub images 12a and 12b to form clipped primitives 7a and 7b. The intersections between the edges of sub regions 12a and 12b and the edges of graphics primitive 7 define new vertices (e.g. 0, 0, 100). Polar transformations are performed on the vertices of the clipped images and by interpolating across the surface of the primitive polar sub images 11 are formed. The polar sub images may then be rendered into the main image using linear interpolation scanline algorithms to produce an image in pseudo polar space as shown in FIG. 7. The image rendered in FIG. 7 is seen to be much closer to a true polar image than the original shown in FIG. 6.

Figure 4:
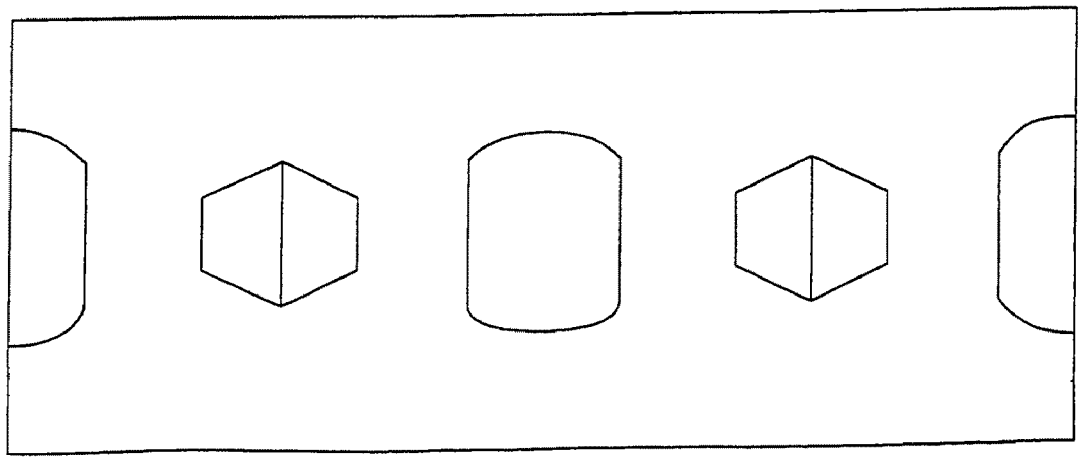

FIG. 4 shows a relatively finely rendered image produced using this technique. As the rendered image is simply being used to control character behaviour, relatively coarse image rendering may be acceptable in most situations.

Figure 8:
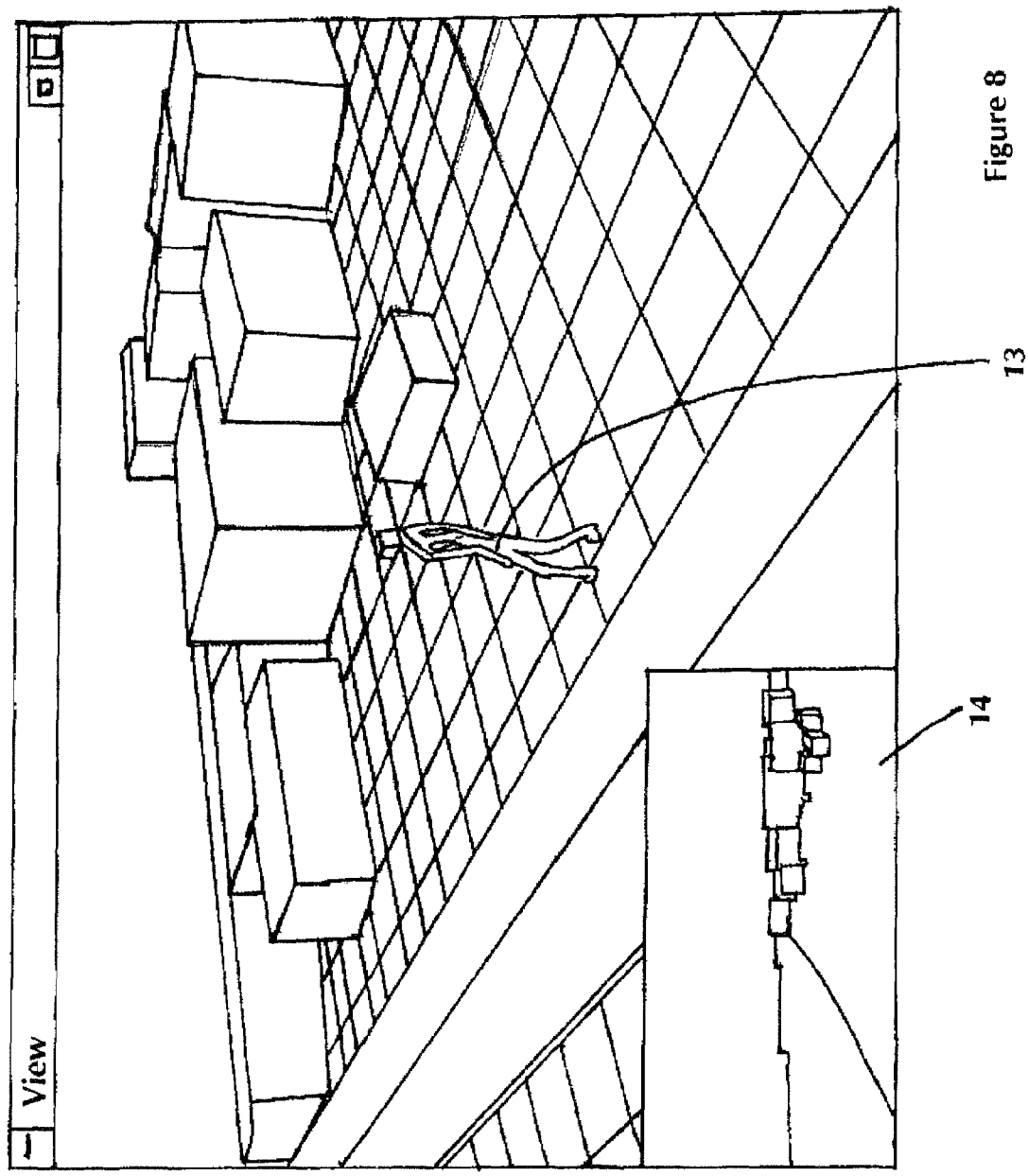
FIG. 8 illustrates an image rendered to guide an autonomous computer generated character.

Referring now to FIG. 8 an articulated autonomous computer generated character 13 is shown within a graphics environment. An image 14 may be generated from the character's point of view utilising a rendering method as described above or another suitable rendering method. Image 14 may be rendered to a resolution appropriate for the behaviour to be modelled. Behaviour of character 13 may be based upon rendered image 14 and/or sound information.

Figure 9:
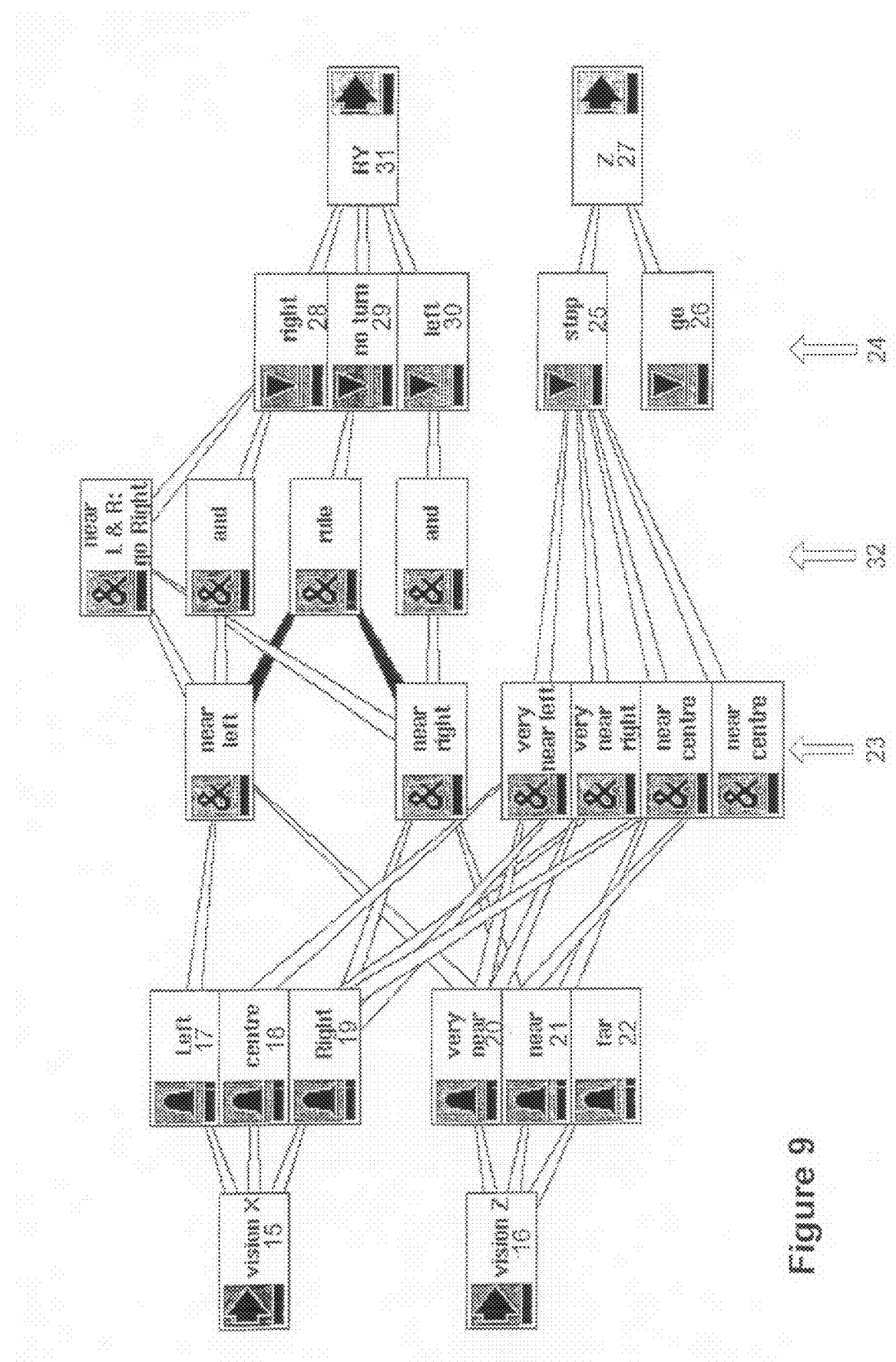
FIG. 9 shows an example of an artificial intelligence engine utilised to control an autonomous computer generated character.

Referring now to FIG. 9 an example of an artificial intelligence engine is shown. An image from the perspective of an autonomous computer generated character, such as image 14, may be input to the first layer. The image is input to the first layer on a pixel-by-pixel basis. The first layer applies fuzzy membership functions to pixel values to obtain fuzzy weightings. In this example two pixel values are utilised. "Vision X"

15 represents a pixel's horizontal co-ordinate value. "Vision Z" 16 represents a pixel's depth value. Fuzzy weightings may be accorded to the pixel's leftness 17, centreness 18, and rightness 19. Fuzzy weighting may also be accorded to the pixel's very nearness 20, nearness 21, and farness 22. The pixels of image 14 may be processed in parallel or as a serial iterated loop to provide fuzzy values for each pixel.

A fuzzy parallel processing layer 23 is provided to apply fuzzy rules to the output values of fuzzy membership functions 17 to 22 on a pixel-by-pixel basis. The values output from each rule in parallel processing layer 23 may then be averaged, a maximum value adopted or some other function applied to obtain a single output value from parallel processing layer 23 for each rule. In this example a fuzzy near left rule utilises the fuzzy weightings from the leftness of the pixel and the very nearness of the pixel to output a value.

Fuzzy parallel processing layer 23 may be replaced by a neural network.

The single values from each rule of layer 23 are then utilised by middle layer 32. In middle layer 32 fuzzy rules are applied to develop activation values. In this example the middle layer applies a fuzzy "near left and right then go right" rule to inputs from fuzzy rules near left and near right from layer 23.

Middle layer 32 may be replaced by a neural network, binary logic network etc. Alternatively both fuzzy parallel processing layer 23 and middle layer 32 may be replaced by a single neural network.

Values from the middle layer 32 are then defuzzified in layer 24 to provide activation values (behavioural outputs). In this example the outputs of fuzzy middle layer 32 are utilised to determine the weighting of a "stop" value 25. "Go" value 26 is the complement of "stop" value 25. The values 25 and 26 determine the "z" speed value 27.

The outputs from fuzzy middle layer 32 are also utilised to control turning. The middle layer values determine the values of "right" value 28, "no turn" value 29 and "left" value 30. These are utilised to obtain a "RY" turn value 31.

Accordingly, based upon an image rendered from the perspective of the autonomous computer generated character, activation values in the form of speed 27 and direction 31 are obtained.

Figure 10:
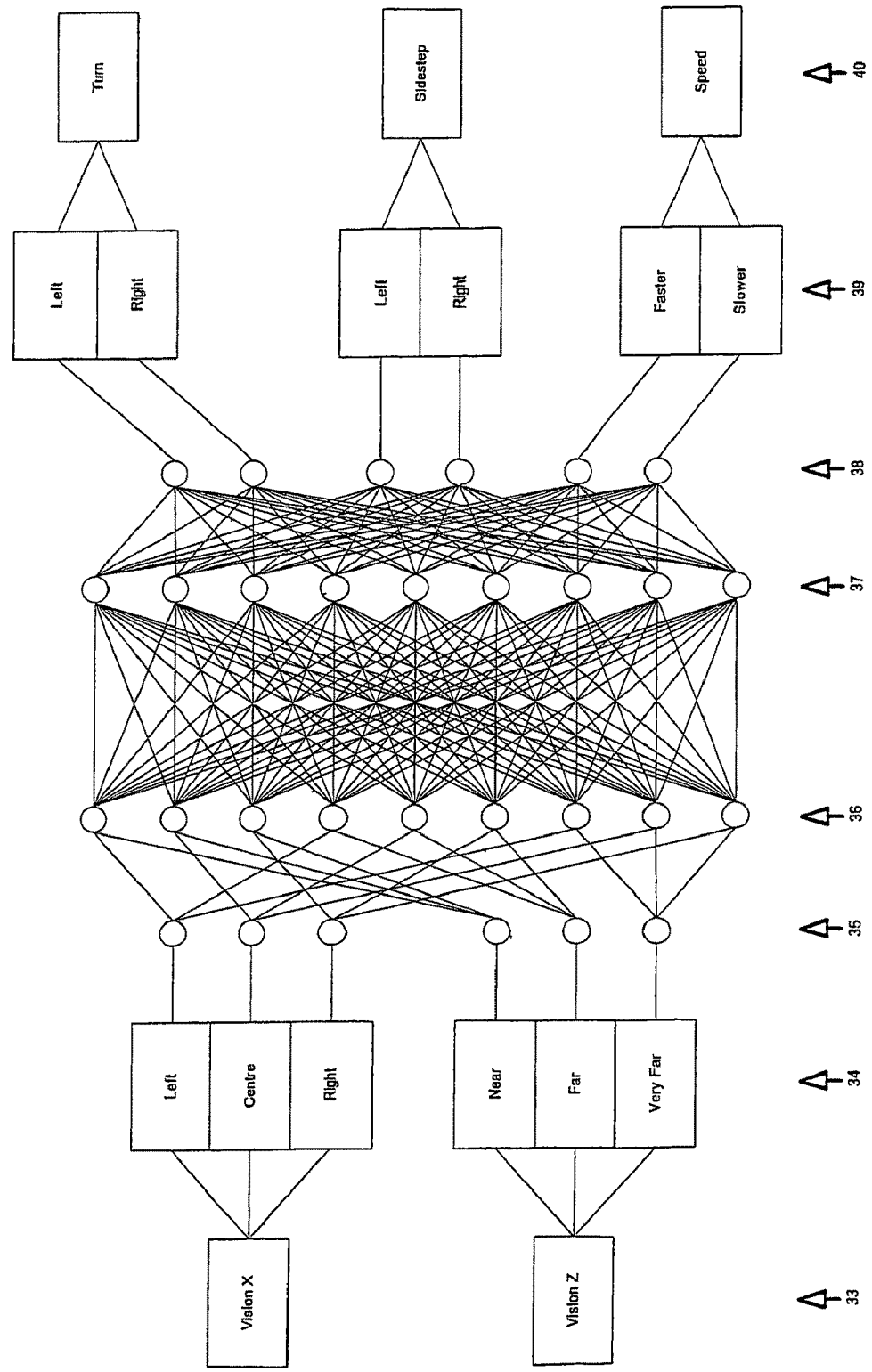
FIG. 10 shows an example of an artificial intelligence engine including a neural network as a layer.

Referring to FIG. 10 an example of an artificial intelligence engine wherein one of the layers is a neural network is shown. An image from the perspective of an autonomous computer generated character, such as image 14, may be input on a pixel-by-pixel basis to the artificial intelligence engine. Each pixel is split into its constituent parts 33 and provided to fuzzy processing layer 34 wherein fuzzy membership functions are applied to obtain fuzzy weightings.

A neural network comprised of an input sub-layer 35, a first hidden sub-layer 36, a second hidden sub-layer 37, and an output sub-layer 38 is shown.

The fuzzy weightings output from fuzzy processing layer 34 are provided to the input sub-layer 35. In this example a neural network utilising perceptrons is shown. It will be appreciated that other forms of neural networks may be used.

The output values 39 from the neural network provide activation values 40.

The behaviour of character 13 may also be dependent upon sound information. Where a sound source is defined within the environment a calculation is first conducted to determine whether the character is within audible range. If so the amplitude of this sound at the location of the character is calculated. If there is an empty sound register the sound value is placed in that register. If there is no empty register the lowest amplitude value within an existing register is replaced if lower than the value of the propagated sound. The register may contain information as to the amplitude, frequency or other characteristics. Words could also be stored and character behaviour may respond to audible words. Information from the sound registers may be fed into middle layer 32 to control behaviour of character 13. Sound information is thus based upon a real physical model in the same way visual information is.

It will be appreciated that the artificial intelligence engine may respond to any desired inputs, such as colour, brightness, contrast, distance from point of view, relative velocity, sound etc. It will also be appreciated that a range of behaviours may be generated, such as obstacle avoidance, navigation, interest tracking, multiple character interaction or the propagation of sound. The output of the artificial intelligence engine may also control animation blending controls. Animation blending controls may be utilised to initiate play back of animation, blend values to control the relative effect of multiple animations, control animation play back rates etc.

Although the invention has been described in relation to a 2D image rendered from a 3D environment utilised as the input it will be appreciated that one dimensional or other rendered images could be used in some applications.

The method of the invention produces surprisingly natural behaviour utilising only a few simple fuzzy rules. Realistic behaviour can be more easily achieved due to the realistic nature of the input data. The method avoids the need to explicitly compute occlusion, visibility and sensory resolution. These are all implicit within the rendering method. Better than n squared scalability for processing times of large numbers of characters in a scene are obtainable (typically close to n proportional where n is the number of characters).

The invention thus provides means to animate an autonomous computer generated character in a realistic manner without high computation requirements.

Where in the foregoing description reference has been made to integers or components having known equivalents then such equivalents are herein incorporated as if individually set forth.

Although this invention has been described by way of example it is to be appreciated that improvements and/or modifications may be made thereto without departing from the scope or spirit of the present invention.

The invention claimed:

1. A computer implemented method of generating behavior of a graphics character within an environment including a selected graphics character and one or more graphics elements, the method comprising: generating pixel values to form an image of the environment from a perspective of the selected graphics character; processing the image using artificial intelligence engine with one or more layers to determine an activation value for the graphics character wherein at least one of the layers is a fuzzy processing layer, directly applying pixel values to the fuzzy processing layer to generate the activation value, and generating the behavior of the graphics character based on the activation value, wherein the image comprises pixels and each pixel is processed by the fuzzy processing layer according to a fuzzy membership function to obtain fuzzy logic values to be used to determine the activation value, wherein the fuzzy processing layer applies fuzzy membership functions to each pixel value to obtain fuzzy weightings and the fuzzy weightings are according to one of the group consisting of: the pixel's leftness; the pixel's centreness; the pixel's rightness; the pixel's very nearness; the pixel's nearness; the pixel's farness.

2. A method as claimed in claim 1 wherein fuzzy rules are applied by a second fuzzy processing layer to the fuzzy logic values for each pixel to obtain output values.

3. A method as claimed in claim 1 wherein a neural network utilizes the fuzzy logic values to obtain output values.

4. A method as claimed in claim 1 wherein processing further comprises using middle layer to process input values to obtain activation values.

5. A method as claimed in claim 4 wherein the fuzzy logic values are the input values processed by the middle layer.

6. A method as claimed in claim 4 wherein the middle layer is a fuzzy logic network.

7. A method as claimed in claim 4 wherein the middle layer is a neural network.

8. A method as claimed in claim 4 wherein the middle layer is a binary logic network.

9. A method as claimed in claim 6 wherein a defuzzifying output layer is utilised to provide activation values.

10. A method as claimed in claim 1 wherein image and sound information is processed to determine the activation value for the graphics character.

11. A method as claimed in claim 1 wherein the image is rendered using a scanline rendering technique.

12. A method as claimed in claim 1 wherein the image is generated by rendering images for a plurality of adjacent sub space areas, wherein the images are rendered as viewed from a common viewpoint and different orientations.

13. The method of claim 1, wherein the pixel values are applied pixel by pixel.

14. The method of claim 1, wherein the fuzzy processing layer applies fuzzy membership functions to each pixel value in parallel.

* * * * *